No. 841,941. PATENTED JAN. 22, 1907.
B. M. CROWLEY.
AXLE.
APPLICATION FILED OCT. 11, 1906.
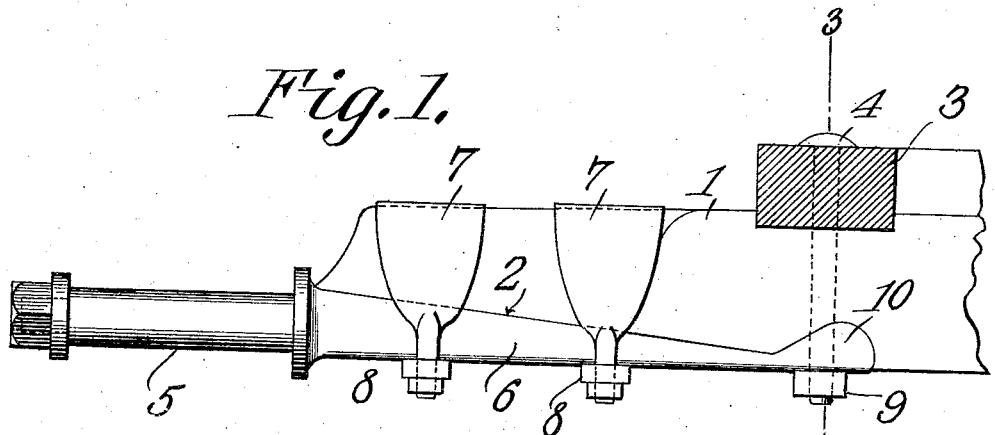
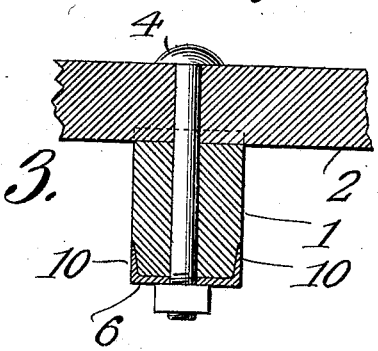
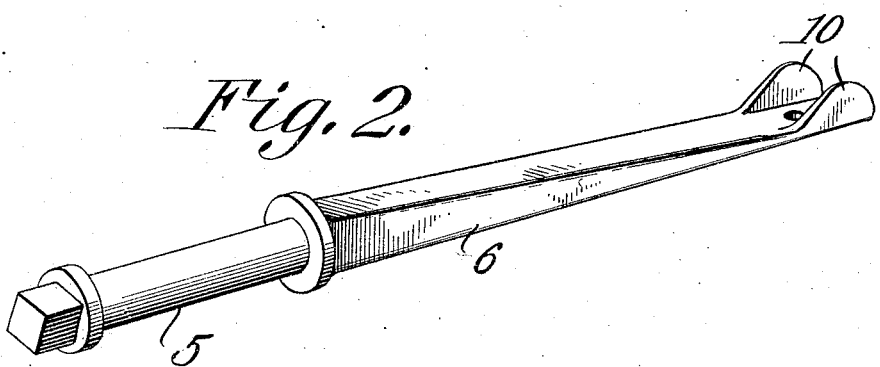
WITNESSES:
Ben M. Crowley,
INVENTOR.
By C. A. Snow & Co.
ATTORNEYS
THE NORRIS PETERS CO., WASHINGTON, D. C.

UNITED STATES PATENT OFFICE.

BENAJAH MILL CROWLEY, OF OMAHA, GEORGIA.

AXLE.

No. 841,941.     Specification of Letters Patent.     Patented Jan. 22, 1907.

Application filed October 11, 1906. Serial No. 338,469.

*To all whom it may concern:*

Be it known that I, BENAJAH MILL CROWLEY, a citizen of the United States, residing at Omaha, in the county of Stewart and State of Georgia, have invented a new and useful Axle, of which the following is a specification.

This invention has relation to axles; and it consists in the novel construction and arrangement of its parts as hereinafter shown and described.

The object of the invention is to provide a simple and durable axle, the major portion of which is made of wood and the end or spindle portions forged from steel, effective securing means being provided, which securing means in its application does not weaken the parts with which they engage.

In the accompanying drawings, Figure 1 is a side elevation of one end of the axle. Fig. 2 is a perspective view of one of the spindles detached, and Fig. 3 is a transverse sectional view of the axle cut on the line 3 3 of Fig. 1.

The intermediate portion 1 of the axle is made from wood and may be of any suitable configuration. It is, however, provided at its under side and at its ends with the inclined plane surfaces 2. The hound or reach 3 is bolted to the top of the axle 1 by means of a bolt 4 in the usual manner. The spindle 5 is provided with the shank 6, which is rectangular in cross-section. The upper side of the shank 6 lies in an inclined plane and is adapted to bear against the inclined surface 2 of the axle 1, so that the lower edge of the shank 6 will lie in the same plane as the lower edge of the axle 1. The clips 7 7 embrace the axle 1 and the cross-plates 8 8 are located below the shank 6 and connect the ends of the clips together in the usual manner. The lower end of the bolt 4 passes through the inner end of the shank 6, and the tap 9 bears against the under side of the said shank. The shank 6 is provided at its inner end and upon opposite sides with the vertically-extending lugs 10, which are embedded in the axle 1 at opposite sides of the perforation thereof that receives the bolt 4 and braces the structure at this point and reduces the tendency of the axle 1 to split at said bolt-perforation. The said lugs also retain the spindle against longitudinal movement with relation to the axle 1.

From the foregoing description it will be observed that an extremely simple and at the same time strong and durable combination of wooden axle and metallic spindle is produced.

Having described my invention, what I claim as new, and desire to secure by Letters Patent, is—

The combination of a wooden axle having a reach or hound attached thereto by means of a bolt passing through the axle, a metallic spindle having a shank provided with a plane inclined upper side, said axle having a plane inclined under side which faces the inclined side of the shank, said shank having at its rear end a perforation which receives the bolt, said shank having at its rear end and at its opposite sides vertically-disposed lugs which are embedded in the axle at opposite sides of the bolt perforation and clips embracing said axle and spindle-shank.

In testimony that I claim the foregoing as my own I have hereto affixed my signature in the presence of two witnesses.

BENAJAH MILL CROWLEY.

Witnesses:
W. J. CARTER,
R. A. WADE.